United States Patent Office 3,254,341
Patented May 31, 1966

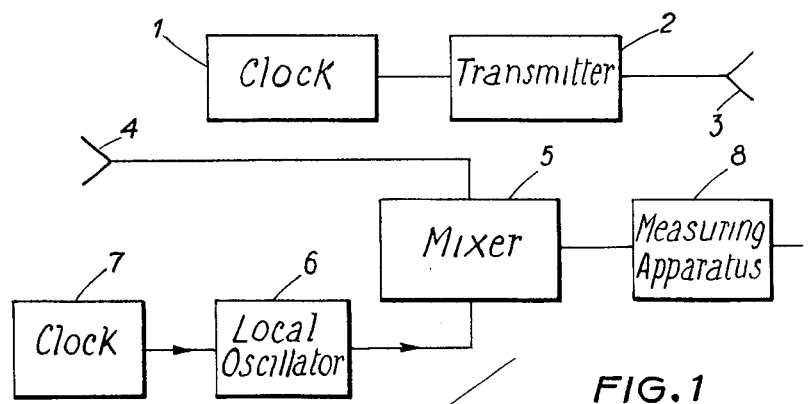
FIG.1
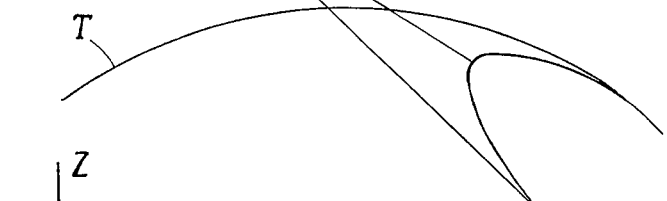
FIG.2
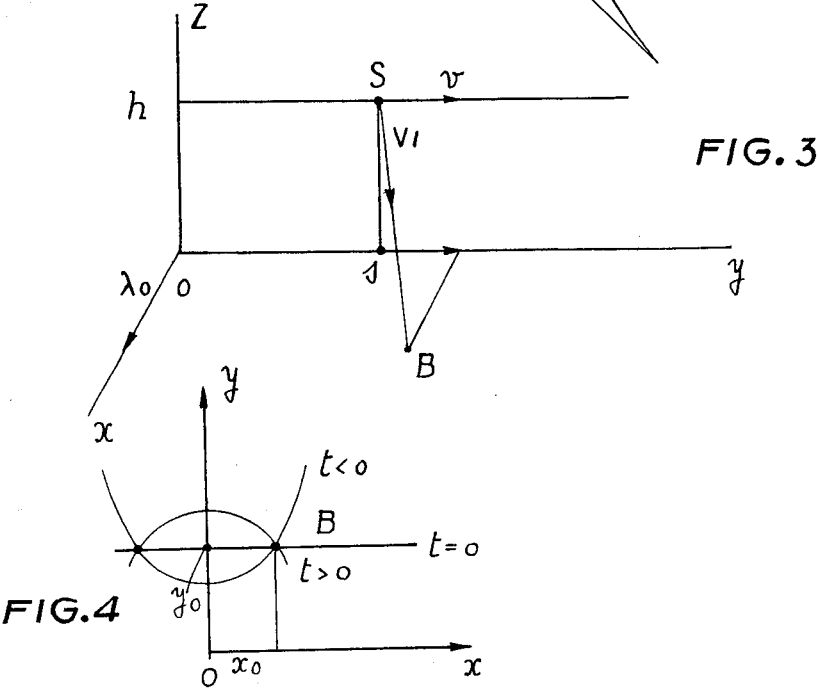
FIG.3
FIG.4

3,254,341
SYSTEMS FOR CALCULATING THE COORDINATES OF A POINT AT THE SURFACE OF THE EARTH
Georges Broussaud, Paris, France, assignor to C.S.F.-Compagnie générale de télégraphie Sans Fil, a corporation of France
Filed Oct. 17, 1962, Ser. No. 231,126
Claims priority, application France, Oct. 31, 1961, 877,542
2 Claims. (Cl. 343—112)

The present invention relates to systems for calculating the cordinates of a point at the surface of the earth.

The system according to the invention is based on the determination of the Doppler shift between signals respectively transmitted by a clock carried by the satellite and by another clock carried on board a vehicle, for example a ship, whose position it is desired to ascertain.

According to one embodiment of the invention, the satellite and the vehicle transmit continuous wave trains having the same frequency and the position of the vehicle is determined by successive measurements of the Doppler shift of the signal received by the vehicle from the satellite.

According to another embodiment, the vehicle and the satellite transmit recurrent trains of synchronized modulated waves and the position of the vehicle is determined both by the phase shift of the modulating signals and the Doppler shift.

The invention will be best understood from the following description and appended drawings, wherein:

FIG. 1 is a diagrammatic view of a system according to the invention;

FIGS. 2, 3, 4 and 5 are explanatory graphs;

Figure 9:
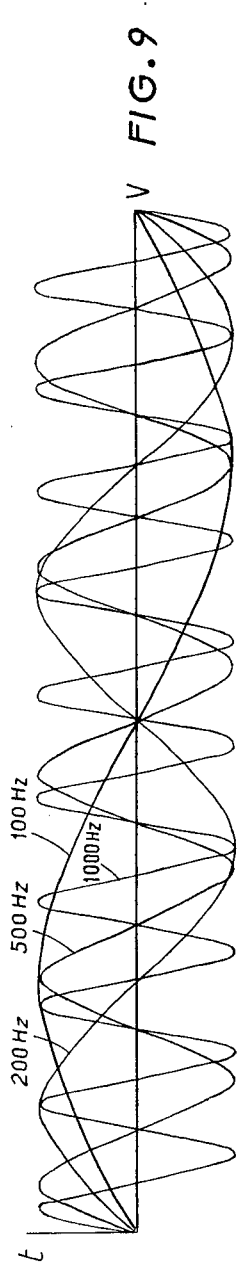
FIGS. 7, 8 and 9 are explanatory curves.

In FIG. 1, there is shown a block diagram of a system according to the invention, which is carried in part by the satellite and in part by a ship, an airplane or another vehicle.

The arrangement on board the satellite comprises a clock, which controls a transmitter 2 which transmits continuous waves through an antenna 3.

An antenna 4, carried by the vehicle, picks up the signals from the satellite, these signals being subjected to the Doppler shift; these signals are mixed in a mixer 5 with those generated by a local oscillator 6, which is controlled by a clock 7, having the same frequency as clock 1. The output of mixer 5 is fed to a measuring apparatus 8 which measures the Doppler shift.

The position and the speed of the satellite at any instant are indicated by tables. Accordingly, at each instant, the locus of the points of the terrestrial globe, where signals are received from the satellite with the same Doppler shift, is known.

This locus is, as shown in FIG. 2, the intersection of the surface of the earth T with a cone whose apex S is the satellite, whose axis is the speed of the vector $$\vec{V}$$

of the satellite, and whose apex angle is $\alpha$, with $$\alpha = \text{arc cos} \frac{V'}{V}$$

$V'$ being the radial speed of satellite with respect to the point considered.

It will be assumed that the approximation will be sufficient, if, as shown in FIG. 3, the earth is assimiliated to a plane surface $xOy$, the coordinates of the vehicle being $xo$, $yo$, those of the satellite, which is assumed to move at a uniform speed along a straight line parallel to the earth at a constant height $h$, being $$x=0, \quad y=vt, \quad z=h$$

and vector $Oy$ being taken parallel to vector $$\vec{V}$$

Under such conditions the locus of the points where the Doppler shift has the same value is a hyperbola corresponding to the intersection of the above mentioned plane and of a cone whose apex is S, whose apex angle is $\alpha$, whose axis parallel to $Oy$.

The equation of this hyperbola is:

$$\frac{y-vt}{\sqrt{x^2+(y-vt)^2+h^2}} = \frac{y_0-vt}{\sqrt{x_0^2+(y_0-vt)^2+h^2}} \quad (1)$$

Thus, a set of hyperbolae corresponding to different instants and having on common the coordinates $x=\pm x_0$ $y=y_0$, is obtained.

Provided the ambiguity as to the sign of $x_0$ is removed, the point where signals are received from the satelilte can be determined by determining the hyperbolae and their points of intersection.

Taking $t=0$ as the origin of time, FIG. 4 shows the family of hyperbolae obtained when $t$ varies, with $y=yo$.

The above considerations are true only if the Doppler frequency or phase shift can be measured with an absolute accuracy, i.e., both the satellite and the vehicle are equipped with perfectly stable clocks.

Actually, this is impossible to achieve, the two clocks show a frequency difference $\Delta f$, and the equation of the hyperbolae become:

$$F(x, y, t, \Delta f) =$$
$$\frac{y-vt}{\sqrt{x^2+(y-vt)^2+h^2}} = \frac{y_0-vt}{\sqrt{x_0^2+(y_0-vt)^2+h^2}} + \frac{c}{v}\frac{\Delta f}{f} \quad (2)$$

$c$ being the velocity of light.

The intersection of the hyperbolae corresponding, one to a time $t_1$, the other to a time $t$, and both corresponding to the same value of $\Delta f$, does not give the true position of the vehicle. When this operation is repeated with several pairs of hyperbolae $H_1$–$H_2$, $H_2$–$H_3$ . . . corresponding to instants $t_1$, $t_2$, $t_3$ . . . the obtained points N form the envelope of the family of hyperbolae defined by Equation 2.

It may be shown that points N describe a curve, the parametric equations of which are substantially as follows:

$$x^2 = x_0^2 + 6K(y_0-vt\sqrt{x^2+(y_0-vt)^2+h^2}$$

$$y = y_0 - K\left[1 - 2\frac{(y_0-vt)^2}{x_0^2+h^2}\right]\sqrt{x_0^2+(y_0-vt)^2+h^2}$$

$$(3)$$

with $$K = \frac{c}{v}\frac{\Delta f}{f}$$

Figure 5:
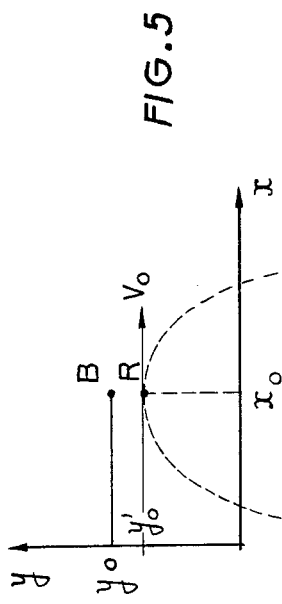
Figure 8:
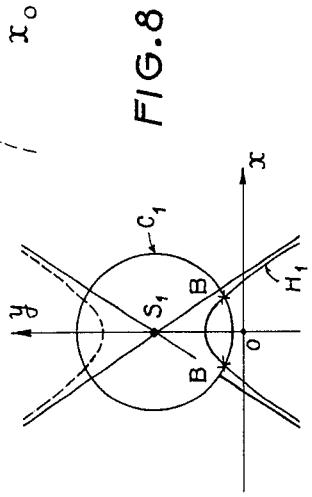

The shape of this curve is shown in FIG. 5. It may be shown that point R where this curve crosses the axis and where $x=x_0$ is characterized by two stationary values, the ordinate $y'_0$ and the speed $V_0$ at this point, $V_0$ being the velocity with which the point obtained moves on the earth.

These two values, which may be measured on the map, make it possible to compute the ordinate $y_0$ and the frequency shift $\Delta f$.

This is done as follows:

$$y_0' = y_0 - \frac{\Delta f}{f}\sqrt{x_0^2 + h^2} \quad (4)$$

$$v_0 = 3c\frac{\Delta f}{f}\frac{\sqrt{x_0^2 + h^2}}{x_0}$$

and therefore:

$$y = y_0' - \frac{V_0}{3v}x_0 \quad (5)$$

$$\frac{\Delta f}{f} = \frac{V_0}{3v}\frac{x_0}{\sqrt{x_0^2 + h^2}} \quad (6)$$

Figure 6:
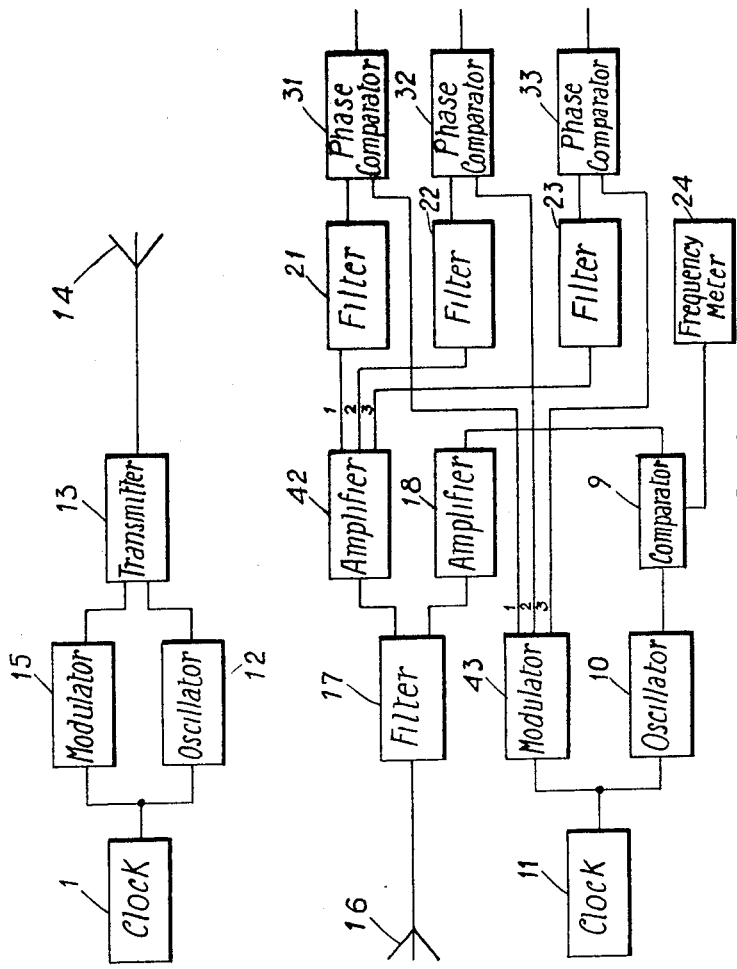
FIG. 6 is a diagrammatic view of another system according to the invention.

FIG. 6 shows another embodiment of the invention. This system is based on the simultaneous measurement of the Doppler shift and of the distance between the satellite and the vehicle. The point obtained is then the intersection of the hyperbola, which is the locus of the points where the Doppler shift has a constant value and of the locus of the points located at a constant distance from the satellite. At each instant two curves are thus provided and their intersection indicates the position of the vehicle.

In the system illustrated in FIG. 6 the satellite carries a stabilized clock 1, which stabilizes the frequency of an oscillator 12, which delivers the carrier wave. Oscillator 12 feeds a transmitter 13 which is coupled to an antenna 14. Clock 1 also stabilizes a modulator 15, which modulates transmitter 13 with several, say three, modulating frequencies.

The system carried by the vehicle comprises an antenna 16, followed by a separating filter 17 having two outputs. At one of these outputs the carrier-wave is collected and amplified by an amplifier 18. A comparator 9 receives this carrier wave and a stabilized frequency signal provided by an oscillator 10, controlled by a clock 11, which delivers the same frequency as clock 1. Comparator 9 is connected to a frequency-meter 24 which measures the Doppler shift. Filter 17 also feeds an amplifier 42 which amplifies the frequency modulating signals. These signals are then separated by filters 21, 22 and 23. Phase comparators 31, 32 and 33 respectively receive these three signals and three local signals from a modulator 43 which is controlled by clock 11, these signals having the same respective frequencies as the modulation frequencies of transmitter 13.

The operation of the assembly is readily understood by considering first the measuring of the Doppler shift and then the distance measuring.

(a) *Measuring of the Doppler shift*

Figure 7:
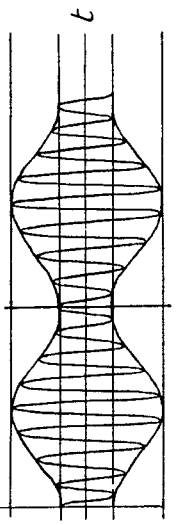

Transmitter 13 is modulated with a very low modulating index by modulator 15 and it may be considered that, for all practical purposes, everything happens as if transmitter 13 were transmitting pure continuous waves. The modulated wave-form is shown in FIG. 7, where the modulation index has been greatly exaggerated.

Comparator 9 measures the difference between the frequency of the transmitted wave and that of the received wave, and thus evidences the radial speed of the satellite with respect to the vehicle.

At each instant $t_1$, the vehicle is on a hyperbola $H_1$ having for its center the projection of satellite S on the ground.

(b) *Measuring the phase difference*

The three signals generated by modulator 13 are illustrated in FIG. 9. The reason why three different modulating frequencies are used will now be explained.

If $\Phi$ is the phase shift due to the distance D covered by the signal during its propagation, $$\Phi = \tau \cdot \frac{2\pi}{T}$$

$$\tau = \frac{D}{c}$$

where
$D$ = the distance of the satellite to the vehicle;
$c$ = the velocity of light;
$T$ = modulation period.

The minimum phase shift $\Delta \varphi$ which can be measured is of the order of a degree.

Since $$\Delta \Phi = \Delta \tau \frac{2\pi}{T} = \frac{D}{c}\frac{2\pi}{T}$$

if it is desired to have an accuracy of the order of 300 meters, it is necessary to have $\Delta \tau \approx 10^{-6}$ sec.

i.e., $$\frac{1}{T} = \text{about 3000 c./s.}$$

It is however obvious that if T is too small, there will be ambiguity as to the distance, since the maximum distance $D_{max}$ which may be measured without ambiguity is:

$$D_{max} = cT$$

if $$D_{max} = 1500 \text{ Km.}$$

since $$c = 300.000 \text{ Km.}$$

$$T > \frac{1}{200}$$

and therefore $f < 200$ c./s.

These requirements are contradictory: to measure great distances, $f$ must be small and, if the device is to be accurate, $f$ must be high.

To reconcile these requirements, several modulation frequencies will be used, for example:

$f_1 = 100$ c./s.
$f_2 = 200$ c./s.
$f_3 = 500$ c./s.

The phase-shift of the signal of frequency $f_1$ will provide the number of hundreds of km., that of the signal having the frequency $f_2$ the kilometers and that of $f_3$ the tens of meters.

Thus, D being known at the instant $T_1$, point B will be a circle $C_2$ of center $S_1$.

The intersection of $C_1$ and $H_1$ will give two points B and B', one of which will be eliminated by removing the ambiguity as known.

Among the advantages of the method according to the invention the following may be noted:

(a) The coordinates of the intersection of a circle and of the hyperbola having the same center, are determined with more precision than in the case of two hyperbolae;

(b) The point will be available with the data obtained at each time $t$.

The measurement of the point is therefore instantaneous and does not take place on account of the measurements effected at successive times.

A calculation would show how the $\Delta t$-phase-shifts in phase of the two clocks and the $\Delta f$ phase-shift in frequency may be eliminated. The calculation is much more complex than in the previous case.

It is to be understood that the invention is not limited to the methods described, and any locating method by means of a satellite, when the Doppler effect is known, is to be considered within the scope of the invention.

What is claimed is:

1. A device for determining the coordinates of a vehicle at the surface of the earth comprising: carried by an artificial satellite, a transmitter for generating ultra-high frequency energy, a first stabilized clock for modulating and controlling said transmitter, and a first aerial for radiating the generated U.H.F. energy; carried by the vehicle, a second aerial for receiving said energy, a local oscillator generating a local wave, a second stabilized clock synchronized with said first clock for controlling said oscillator, a mixer for mixing said energy and said local wave, a meter coupled to said mixer for measuring the Doppler effect between said local wave and said energy, means controlled by said first and said second clock respectively for cyclically modulating in synchronism said transmitter and said local oscillator, and means carried by the vehicle for measuring the phase-shift between said modulating means.

2. A device for determining the coordinates of a vehicle at the surface of the earth comprising: carried by an artificial satellite, a transmitter for generating ultra-high frequency energy, a first stabilized clock for modulating and controlling said transmitter, and a first aerial for radiating the generated U.H.F. energy; carried by the vehicle, a second aerial for receiving said energy, a local oscillator generating a local wave, a second stabilized clock synchronized with said first clock for controlling said oscillator, a mixer for mixing said energy and said local wave, a meter coupled to said mixer for measuring the Doppler effect between said local wave and said energy, a first plurality of modulators stabilized by said first clock and a second plurality of modulators stabilized by said second clock for respectively amplitude modulating said U.H.F. energy and said local wave, the modulators of said first plurality being associated respectively with the modulators of said second plurality for generating associated modulating energies having the same frequencies, and means carried by said vehicle for measuring the respective phase-shifts between said associated modulating energies.

References Cited by the Examiner

UNITED STATES PATENTS 2,838,753   6/1958   O'Brien et al.
2,947,985   8/1960   Cooley.

OTHER REFERENCES

"Navigation" (Journal of the Institute of Navigation), vol. 7, No. 4, received in Patent Office, May 15, 1961, pp. 204–212.

CHESTER L. JUSTUS, *Primary Examiner.*

R. E. BERGER, *Assistant Examiner.*